(12) United States Patent
Rodriguez et al.

(10) Patent No.: US 9,197,635 B2
(45) Date of Patent: Nov. 24, 2015

(54) REMOTE VERIFICATION OF USER PRESENCE AND IDENTITY

(71) Applicants: Lazaro Rodriguez, Hialeah, FL (US); Michael McNeely, Hialeah, FL (US)

(72) Inventors: Lazaro Rodriguez, Hialeah, FL (US); Michael McNeely, Hialeah, FL (US)

(73) Assignee: NOA, Inc., Miami Beach, FL (US)

( * ) Notice: Subject to any disclaimer, the term of this patent is extended or adjusted under 35 U.S.C. 154(b) by 0 days.

(21) Appl. No.: 14/525,206

(22) Filed: Oct. 27, 2014

(65) Prior Publication Data

US 2015/0113273 A1    Apr. 23, 2015

Related U.S. Application Data

(63) Continuation of application No. 13/279,244, filed on Oct. 21, 2011, now abandoned.

(60) Provisional application No. 61/405,643, filed on Oct. 21, 2010.

(51) Int. Cl.
*H04L 29/06* (2006.01)
*H04L 9/32* (2006.01)

(52) U.S. Cl.
CPC ............. *H04L 63/0853* (2013.01); *H04L 9/32* (2013.01); *H04L 9/321* (2013.01); *H04L 9/3228* (2013.01); *H04L 63/067* (2013.01)

(58) Field of Classification Search
None
See application file for complete search history.

(56) References Cited

U.S. PATENT DOCUMENTS

| | | | | |
|---|---|---|---|---|
| 5,784,463 A * | 7/1998 | Chen | ....................... | G06F 21/33 380/282 |
| 6,449,651 B1 * | 9/2002 | Dorfman | ............... | G06F 21/305 235/382 |
| 6,609,115 B1 * | 8/2003 | Mehring | ............. | G06F 21/6218 705/51 |
| 7,093,137 B1 * | 8/2006 | Sato | .................... | G06F 21/6227 380/277 |
| 7,219,138 B2 * | 5/2007 | Straut | ................. | G06F 11/3438 709/219 |
| 7,260,726 B1 * | 8/2007 | Doe | ........................ | G06F 21/34 380/228 |
| 7,664,960 B1 * | 2/2010 | Clubb | ..................... | G06F 21/31 380/221 |
| 7,979,716 B2 * | 7/2011 | Fiske | ...................... | G06F 21/32 711/164 |
| 8,004,491 B2 * | 8/2011 | Maynard | ............. | G06F 17/2211 345/156 |
| 8,146,164 B2 * | 3/2012 | Eshun | ................... | G06F 21/606 726/26 |
| 8,176,324 B1 * | 5/2012 | Krishnamurthy | ..... | G06F 3/0236 380/45 |
| 8,239,679 B2 * | 8/2012 | Lu | ......................... | H04L 9/3271 455/411 |
| 8,611,544 B1 * | 12/2013 | Herbach | .................. | H04L 63/08 380/279 |
| 2002/0046353 A1 * | 4/2002 | Kishimoto | .......... | H04L 63/0442 726/28 |
| 2002/0182578 A1 * | 12/2002 | Rachman | ................. | G09B 5/06 434/350 |
| 2004/0073797 A1 * | 4/2004 | Fascenda | .............. | H04L 9/3234 713/171 |
| 2004/0139182 A1 * | 7/2004 | Chang | ................. | G06F 21/6218 709/223 |

(Continued)

FOREIGN PATENT DOCUMENTS

SE    WO 2009025605 A2 *    2/2009    ............. G06Q 20/12

*Primary Examiner* — Dede Zecher
*Assistant Examiner* — Richard McCoy
(74) *Attorney, Agent, or Firm* — Christian Sanchelima; Jesus Sanchelima

(57) ABSTRACT

A system for verifying the presence and identity of a user on a remote computer having a server connected to a network, the network being connected to one or more remote computers. The system further includes a microcontroller connected to the remote computer by means such as USB, and registered with the server. The USB microcontroller is authenticated upon being inserted into a remote computer and is continuously authenticated thereafter until the user disconnects the USB microcontroller from the computer. When the proper authentication is satisfied, the system runs a secure web browser that is used to access websites that may have a user's confidential and sensitive data. Upon disconnecting the USB device, the secure web browser closes and none of the session data is stored locally on the computer.

18 Claims, 5 Drawing Sheets

(56) References Cited

U.S. PATENT DOCUMENTS

| | | | |
|---|---|---|---|
| 2005/0235144 A1* | 10/2005 | Jacobs | G06F 17/243 713/165 |
| 2007/0061566 A1* | 3/2007 | Bailey | H04L 9/0866 713/151 |
| 2007/0083540 A1* | 4/2007 | Gundla | G06F 17/30017 |
| 2007/0155204 A1* | 7/2007 | Klitsner | A63F 13/12 439/131 |
| 2007/0180507 A1* | 8/2007 | Lu | G06F 21/34 726/5 |
| 2007/0234064 A1* | 10/2007 | Nihei | G06F 21/34 713/183 |
| 2009/0029771 A1* | 1/2009 | Donahue | A63F 13/10 463/31 |
| 2009/0063626 A1* | 3/2009 | Nakagawa | H04L 29/12103 709/203 |
| 2009/0064302 A1* | 3/2009 | Colella | G06Q 20/3674 726/9 |
| 2009/0187687 A1* | 7/2009 | Hulbert | G06F 9/4411 710/73 |
| 2009/0271633 A1* | 10/2009 | Cohen | G06F 21/34 713/185 |
| 2010/0062834 A1* | 3/2010 | Ryan | G07F 17/32 463/25 |
| 2010/0198674 A1* | 8/2010 | Boucard | G06Q 30/0269 705/14.25 |
| 2010/0199334 A1* | 8/2010 | Ehrensvard | G06F 21/34 726/5 |
| 2010/0313078 A1* | 12/2010 | Burckart | H04L 67/14 714/48 |
| 2010/0325435 A1* | 12/2010 | Park | H04L 9/0844 713/171 |
| 2011/0029433 A1* | 2/2011 | Thoo | G06Q 30/04 705/40 |
| 2011/0101093 A1* | 5/2011 | Ehrensvard | G06Q 20/385 235/380 |
| 2011/0119155 A1* | 5/2011 | Hammad | G06Q 30/04 705/26.41 |
| 2011/0197266 A1* | 8/2011 | Chu | H04L 9/3228 726/5 |
| 2011/0265156 A1* | 10/2011 | Bombay | G06F 21/34 726/5 |
| 2011/0321139 A1* | 12/2011 | Jayaraman | G06F 21/51 726/4 |
| 2012/0018506 A1* | 1/2012 | Hammad | G06F 21/34 235/375 |
| 2012/0210119 A1* | 8/2012 | Baxter | G06F 17/30861 713/150 |
| 2012/0233684 A1* | 9/2012 | Denis | G06F 21/335 726/9 |
| 2012/0254955 A1* | 10/2012 | Suginaka | G06F 21/42 726/4 |
| 2013/0018979 A1* | 1/2013 | Cohen | H04L 67/125 709/217 |
| 2014/0282945 A1* | 9/2014 | Smith | G06F 21/32 726/6 |
| 2014/0310729 A1* | 10/2014 | Chaniotakis | G09B 5/08 719/328 |
| 2015/0116084 A1* | 4/2015 | Yeara | G07C 9/00309 340/5.65 |
| 2015/0242609 A1* | 8/2015 | Zheng | G06F 21/35 713/159 |

* cited by examiner

REMOTE VERIFICATION OF USER PRESENCE AND IDENTITY

OTHER RELATED APPLICATIONS

The present application is a continuation-in-part of U.S. patent application Ser. No. 13/279,244, filed on Aug. 26, 2011, which is hereby incorporated by reference. U.S. patent application Ser. No. 13/279,244 is the parent application of provisional application 61/405,643 filed on Oct. 21, 2010 that is also incorporated by reference.

BACKGROUND OF THE INVENTION

1. Field of the Invention

The present invention relates to a remote verification system and, more particularly, to such a system that provides users with a secure web browser to access sensitive information on a computer.

2. Description of the Related Art

Several designs for remote verification systems have been designed in the past. None of them, however, include a system using a microcontroller, such as a USB, that when inserted into a computer verifies a user's identity with a server and when authorized with a secure web browser allows the user to access websites that hold confidential data.

Applicant believes that the closest reference corresponds to U.S. patent No. 2007/0061566 issued to Baily et al. The Bailey reference teaches of a server connected to a network using a remote computer that communicates with a USB device through software programs downloaded on the remote computer. However, it differs from the present invention because the present invention uses a secure web browser that is generated and can only be accessed by the user who owns the USB. A secure web browser allows the user to access web pages, such as those for banks, making a payment, on a computer while eliminating the risks associated with data being saved on a computer's local memory and not having to create multiple passwords for different websites. The Bailey reference does not teach or motivate one to develop a specialized system that does not require the use of any programs that may capture a user's data locally. The Bailey reference does not teach of a secure web browser to be accessed by authentication when a user enters a USB into the computer.

The present invention also differs from the Bailey reference because the present invention continuously verifies whether the USB is still plugged into the computer. The Bailey reference does not teach of verifying whether the USB is still plugged into the computer while the user is using the system. This leads to vulnerabilities in the safety and reliability of the system.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system that allows a user to access confidential and personal information on websites using a secure web browser that does not allow any of a user's sensitive information to be stored locally on a computer.

It is another object of this invention to provide a system that continuously authorizes a user during his session using the system.

It is yet another object of this invention to provide such a verification system that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
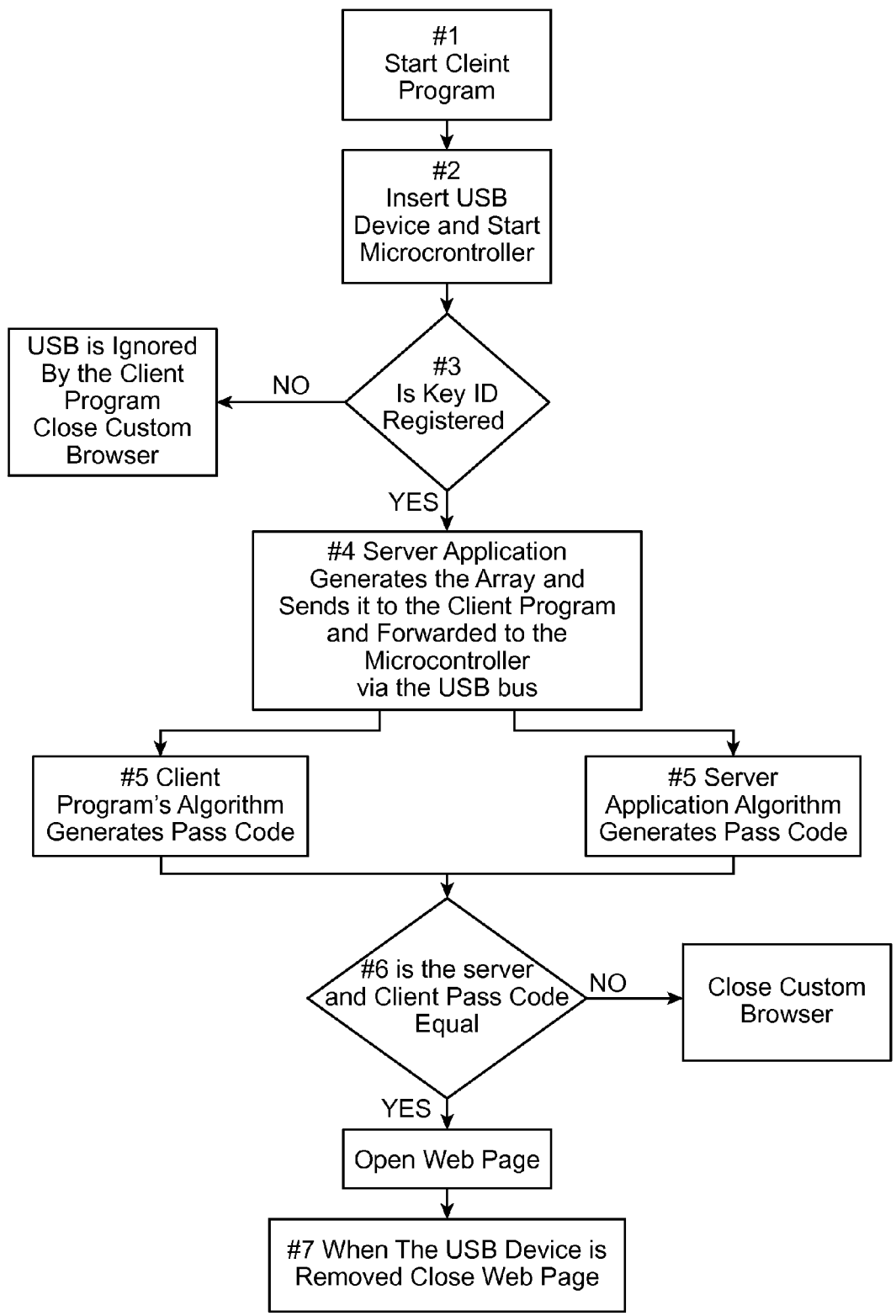
FIG. 1 represents a general flowchart outlining a user's steps when using the remote verification system.
Figure 2:
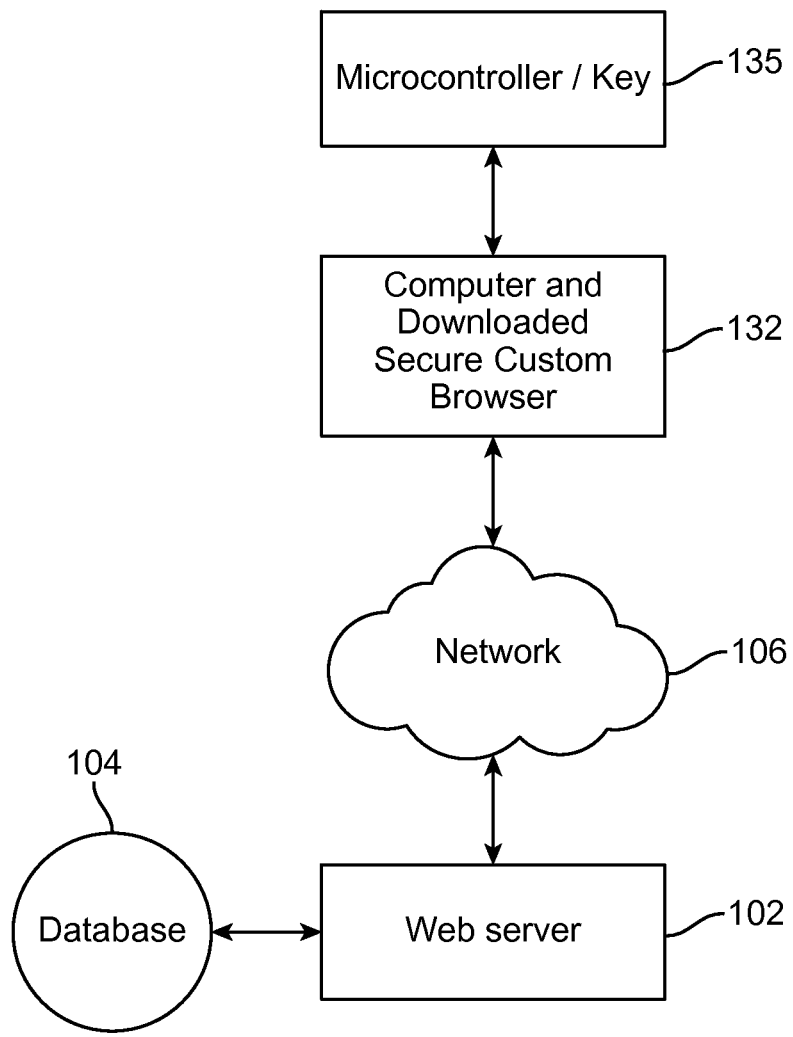
FIG. 2 represents the operating environment of the remote verification system.
Figure 3:
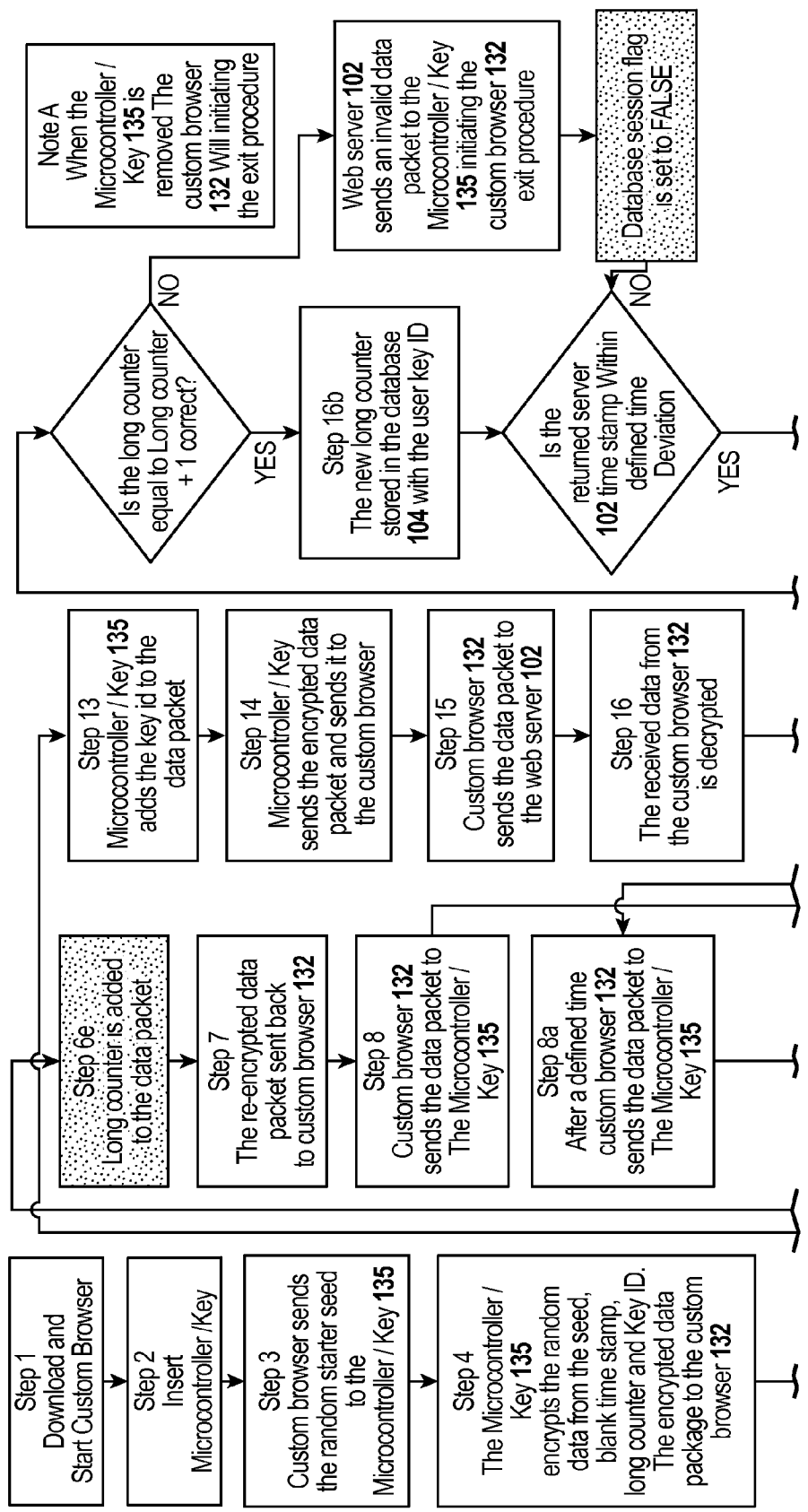
FIG. 3 represents part one of three of a detailed flowchart outlining a user's steps when using the remote verification system.
Figure 3A:
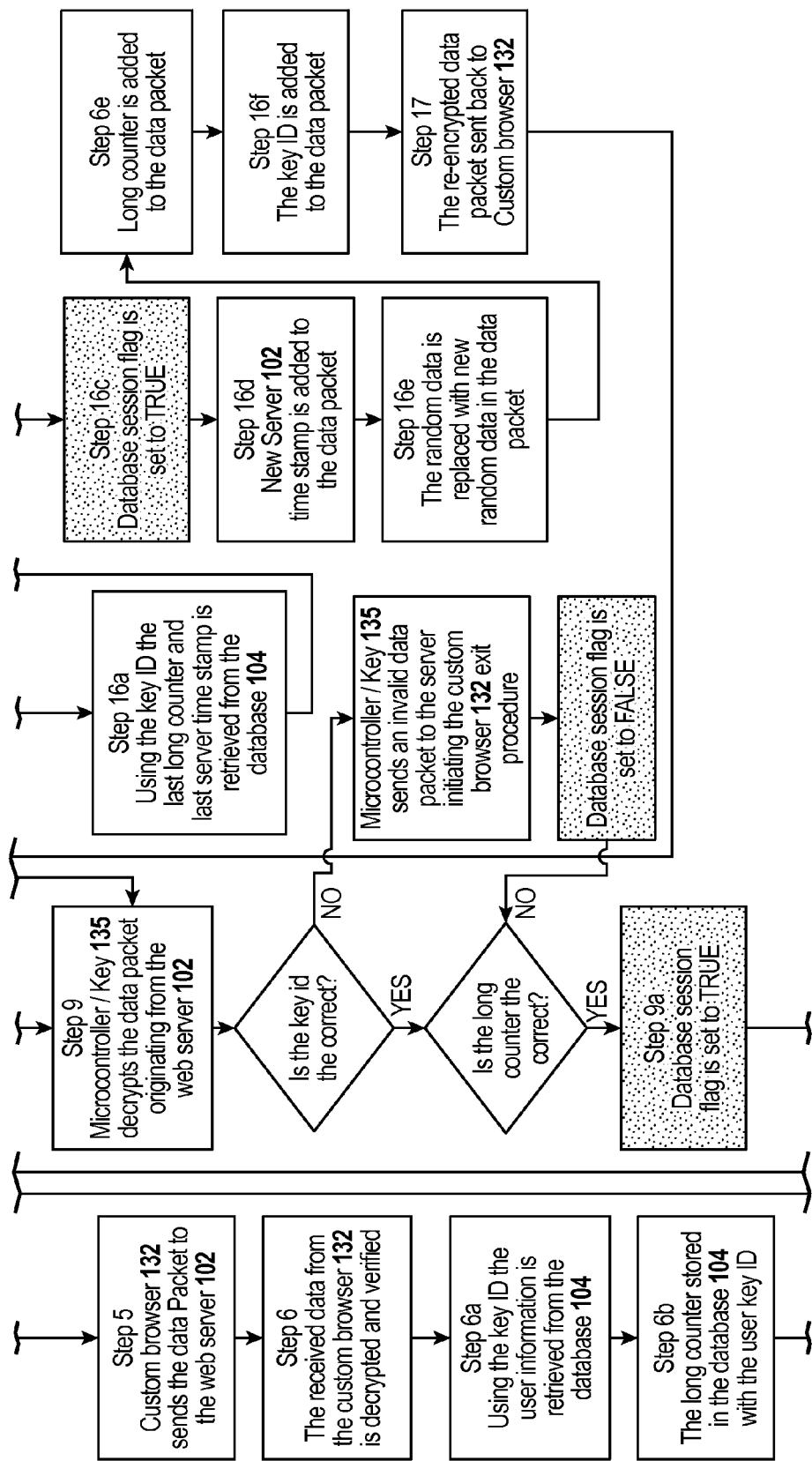
FIG. 3A represents part two of three of a detailed flowchart outlining a user's steps when using the remote verification system.
Figure 3B:
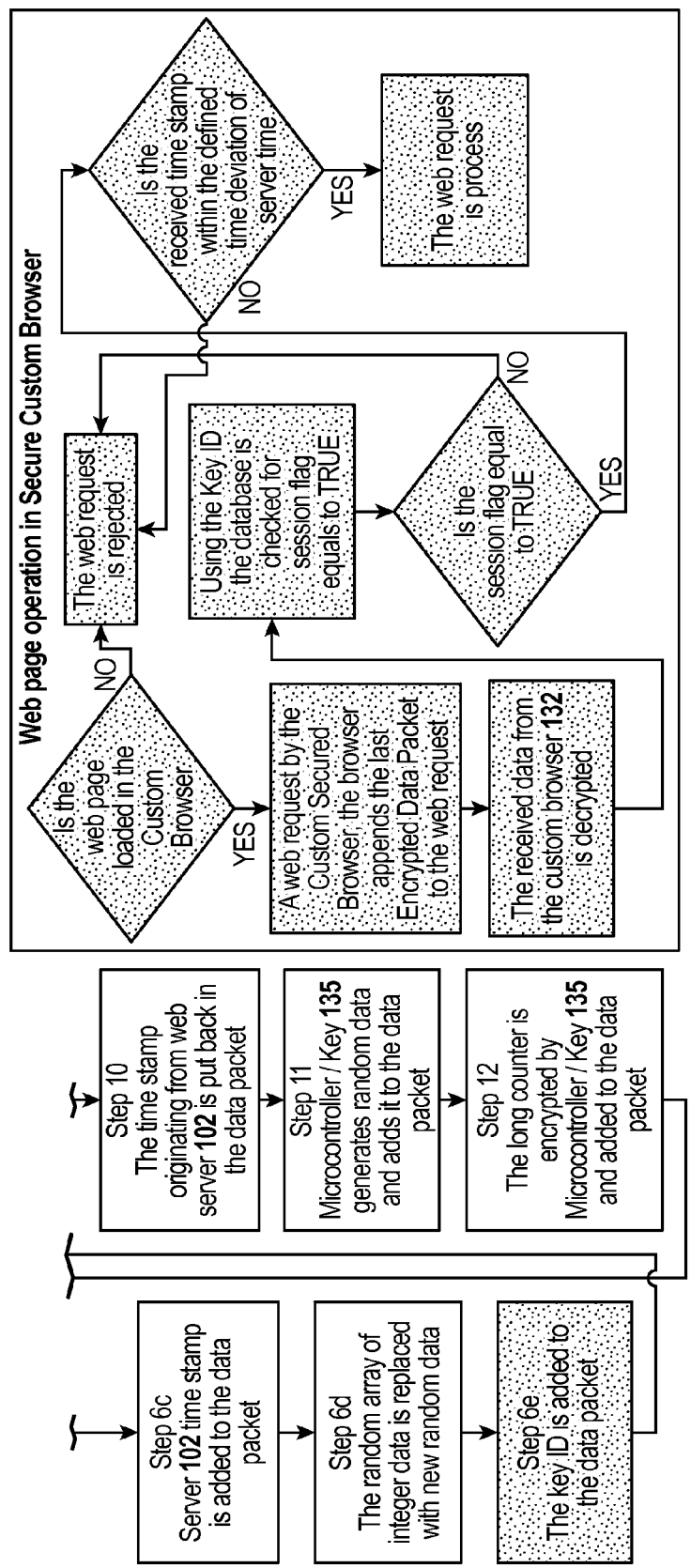
FIG. 3B represents part three of three of a detailed flowchart outlining a user's steps when using the remote verification system.

Referring now to the drawings, where the present invention is generally referred to with numeral 10, it can be observed that it basically includes a secure web browser as an executable program or a script within the browser. A USB having a microcontroller is then inserted into the computer. The custom browser sends a random start seed to the USB to start the encryption process.

The microcontroller/key uses an encryption procedure to encrypt data (encrypt data as an OTP, a 'One Time Password'). The OTP can be automatically generated or can be generated by a user activating a switch connected to the microcontroller within the USB. The present invention's program only needs the encryption for a short time because it will generate a new encrypted code anyway after a short, predetermined time. The encryption code is created using a combination of a random starter seed, long counter, blank time stamp, random data and key ID. The key ID is in the microcontroller of the USB. The encrypted data package is sent to the secure web browser, which then forwards the encrypted data package to the server. The received encrypted data package is then decrypted. The key ID allows the server to retrieve the user's information from the server's database.

The long counter generated by the microcontroller/key is in the server's database when the microcontroller adds one to the long counter, the server uses the long counter from the microcontroller to match it with the long counter it has stored in its database after a one is added to it. This is done until the user ends their session or disconnects the USB. The decrypted data package is re-encrypted and sent back to the secure web browser, which forwards it to the microcontroller inside the USB. The microcontroller decrypts the re-encrypted data packet it received from the secure web browser. If the decrypted data packet matches the key ID in the microcontroller and the long counter in the decrypted packet is correct, then the microcontroller adds the server-originated time stamp into the new data packet created by the microcontroller.

The microcontroller then generates a new random array of integers to include in the new data packet. The microcontroller then adds one to the long counter received from the server and includes it in the new data packet. The microcontroller then adds the key ID to the new data packet. The microcontroller encrypts the newly formed data packet and sends it back to the secure web browser. The secure web browser then sends the newly encrypted data packets to the server.

If the key ID or long counter received by the microcontroller from the server were incorrect, the microcontroller sends a notification packet of invalidity to the secure web browser, which forwards the notification to the server, the server then sends a command back to the secure web browser to initiate exit procedures. Assuming the key ID and the long counter were correct, after the server receives new encrypted data packet from the microcontroller via the secure web browser, the received encrypted data packet is decrypted.

Upon the server receiving the data packet it decrypts the data packet to obtain the associated key ID. Then, the long counter and time stamp are obtained from the newly decrypted data packet. The long counter obtained should now reflect the plus one to the long counter added by the microcontroller. If not, the server sends a notification to the secure web browser of invalidity and exit procedures are commenced.

If the long counter is correct, it is stored in the server's database along with the key ID. The server then generates a new time stamp, matches it with the time stamp sent by the microcontroller and calculates whether the time stamp sent by the microcontroller is within the allowable time frame. In one embodiment, the deviation allowed between time stamps is three seconds. If within the allowable deviation, the server then adds the new time stamp to the new data packet. If outside the allowed time frame, the server sends a notification to the secure web browser of invalidity and exit procedures are commenced.

The server then generates a new random array of integers to replace the old random array of integers. The new random integers are added to the data packet. The long counter and key ID are added to the new data packet.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for verifying presence and identity of a user on a remote computer, comprising:
    a server connected to a networked communication system;
        a remote computer including a client program, wherein said client program is a secure web browser that communicates with a microcontroller, said microcontroller being a USB device, wherein said USB device is registered with said server, said USB device having an encryption and authentication program that creates an encrypted key and verifies whether said USB device remains connected to said remote computer, wherein a user can access information via a session of said secure web browser upon authentication being verified by said system, and wherein said remote computer is connected to said networked communication system
    wherein said remote computer acquires said encrypted key from said USB device and transmits said encrypted key to said server, said server then uses said encrypted key to verify that said USB device is registered; wherein said server and said USB device each have an algorithm that generates respective encrypted random integers and time stamps, wherein said server periodically checks whether said respective random integers match; said server allowing the user to access web pages from said server via the session using said secure web browser upon said respective integers matching;
    said server and said USB device each further configured to send instructions to said secure web browser to terminate the session when said time stamp generated by said encryption program is outside of a predetermined time frame; wherein said server sends instructions to said secure web browser to terminate the session when said USB device is disconnected from said remote computer; and both said server and said USB device send instructions to said secure web browser to terminate session when said integers do not match.

2. The system of claim 1, wherein said server further includes a database for storing user records and user credentials.

3. The system of claim 1, wherein said client program captures the user's activity while using said client program.

4. The system of claim 1, wherein said secure web browser is an exe file.

5. The system of claim 1, wherein said secure web browser is a script within a browser.

6. The system of claim 1, wherein said script is served to said remote computer by said server.

7. The system of claim 1, wherein said secure web browser is installed on said remote computer.

8. The system of claim 1, wherein said remote computer acquires said encrypted key from said USB device at the time that said USB device is connected to said remote computer.

9. The system of claim 1, wherein said secure web browser is a custom browser.

10. A system for verifying presence and identity of a user on a remote computer, comprising: a server connected to a networked communication system; a remote computer including a client program, wherein said client program is a secure web browser that communicates with a microcontroller, wherein said microcontroller is registered with said server, said microcontroller having an encryption and authentication program that creates an encrypted key and verifies whether said microcontroller remains connected to said remote computer, wherein a user can access information via a session of said secure web browser upon authentication being verified by said system, and wherein said remote computer is connected to said networked communication system;
    wherein said remote computer acquires said encrypted key from said microcontroller device and transmits said encrypted key to said server, said server then uses said encrypted key to verify that said USB device is registered; wherein said server and said microcontroller device each have an algorithm that generates respective encrypted random integers and time stamps, wherein said server periodically checks whether said respective random integers match; said server allowing the user to access web pages from said server via the session using said secure web browser upon said respective integers matching;
    said server and said microcontroller each further configured to send instructions to said secure web browser to terminate the session when said time stamp generated by said encryption program is outside of a predetermined time frame; wherein said server sends instructions to said secure web browser to terminate the session when said microcontroller is disconnected from said remote computer; and both said server and said microcontroller send instructions to said secure web browser to terminate session when said integers do not match.

11. A system for verifying presence and identity of a user on a remote computer, comprising:
a server connected to a networked communication system;
a remote computer including a client program, wherein said client program is a secure web browser that communicates with a microcontroller, wherein said microcontroller is registered with said server, said microcontroller having an encryption and authentication program that creates an encrypted key and verifies whether said microcontroller remains connected to said remote computer, wherein a user can access information via a session of said secure web browser upon authentication being verified by said system, and wherein said remote computer is connected to said networked communication system;
wherein said remote computer acquires said encryption program from said microcontroller; said remote computer transmitting a random array of integers and a time stamp to said server, said server running a copy of said encryption program, said copy generating said random array of integers at the time of said time stamp, said server verifying that said microcontroller is registered with said server by comparing said random array of integers to said random array of integers received from said remote computer, said server rejecting said remote computer if said microcontroller is not registered at said server;
wherein said server allows the user to access web pages via the session on said server when said microcontroller has been verified to be registered with said server; and wherein said server instruct said secure web browser to close its windows when said microcontroller is disconnected from said remote computer; and both said server and said microcontroller send instructions to said secure web browser to terminate session when said integers do not match.

12. The system of claim 11, wherein said secure web browser comprises a script within a browser and said script is served to said remote computer by said server.

13. The system of claim 11, wherein said remote computer acquires encrypted key from said microcontroller at the time of the connection of said microcontroller with said remote computer.

14. The system of claim 11, wherein said microcontroller is connected to said remote computer using near-filed communication.

15. The system of claim 11, wherein said server further includes a database for storing user records and user credentials.

16. The system of claim 11, wherein said client program captures the user's activity while using said client program.

17. The system of claim 11, wherein said secure web browser is an exe file and said secure web browser is installed on said remote computer.

18. The system of claim 11, wherein said secure web browser is a custom browser.

* * * * *